(12) United States Patent
Motamed et al.

(10) Patent No.: US 6,327,050 B1
(45) Date of Patent: Dec. 4, 2001

(54) PRINTING METHOD AND APPARATUS HAVING MULTIPLE RASTER IMAGE PROCESSORS

(75) Inventors: Margaret Motamed, Foster City; Alon Segal, San Francisco; Chew Yan Kong, Mountain View; Ravindranath Gunturu, Newark; Ghilad Dziesietnik, Palo Alto, all of CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/298,639

(22) Filed: Apr. 23, 1999

(51) Int. Cl.⁷ ..................................................... G06F 15/00
(52) U.S. Cl. ..................... 358/1.18; 358/1.17; 358/1.16; 358/1.15
(58) Field of Search ................................ 358/1.15, 1.16, 358/1.17, 1.18, 1.14, 1.12, 1.13

(56) References Cited

U.S. PATENT DOCUMENTS 6,049,390 * 4/2000 Notredame et al. ................. 358/1.15

FOREIGN PATENT DOCUMENTS

| 0545261A1 | * 11/1992 | (EP) | G06F/3/12 |
| 545261A1 | 6/1993 | (EP) | G06F/3/12 |
| 578258A1 | 1/1994 | (EP) | G06F/3/12 |
| WO 96/01449 | 1/1996 | (WO) | G06F/3/12 |

* cited by examiner

Primary Examiner—Dov Popovici
Assistant Examiner—Twyler Lamb
(74) Attorney, Agent, or Firm—Michael A. Glenn

(57) ABSTRACT

A multiple raster image processor (RIP) system which enables faster system performance over multiple processors includes a zero RIP feature consisting of a language interpreter sub-RIP that interprets a print instruction file but does not process the graphics rendering steps or the post-language processing operators. The zero RIP discovers page related attributes for individual pages within a multipage job and reports any potential errors or warnings with the file. A thumb RIP consists of a very low resolution RIP that is used specifically for the creation of thumbnail images. A skip RIP interprets selected pages in a way that skips all or most of the processing for that page. Pages to be skipped are scheduled for a different processor, thereby saving processing time and enabling the provision of a multiple processor RIP. A rules based scheduler on an page/face or machine characteristic basis supports a dynamic assignment and assessment algorithm. Scheduling results in optimum use of available resources and requested print constraints (e.g. constrained time window) and optimum use of system bandwidth (e.g. bandwidth control). Archiving and editing capability enables tagged archiving of jobs or parts of jobs in a post RIPed (i.e. raster) format in a special cache located with in the multiRIP system.

14 Claims, 2 Drawing Sheets

PRINTING METHOD AND APPARATUS HAVING MULTIPLE RASTER IMAGE PROCESSORS

BACKGROUND OF THE INVENTION

1. Technical Field

The invention relates to the printing of images, which exist in a digital electronic format. More particularly, the invention relates to a printing method and apparatus having multiple raster image processors.

2. Description of the Prior Art

Every image that exists in a digital electronic format is made of picture elements. At some point, all such digital image data, whether expressed as vector format data or bitmap format data, must be rendered into pixels for display on a monitor or for printing on a printer. All images, therefore, have pixels as their base. Rendering, or translating the digital data into physical output, is the most important part of realizing such images. The term raster image processing (RIP) refers to the process of translating digital image data into physical visual images and graphics. FIG. 1 is a block schematic diagram showing a conventional raster imaging processor in which raster images are images composed of lines of pixels. In raster image processing, each horizontal line of bitmap image pixel information is referred to as a scan line or raster line. In FIG. 1, Postscript® lines and/or digital RGB or CMYK pixels 12 are shown processed by associated RIPs 13–15 to produce information that results in a physical output 16.

The simplest output devices translate only one raster line at a time and then output that line to film, paper, or a monitor. FIG. 2 is an illustration of an image 20 and a single raster line 22 as processed by such device. More efficient RIP techniques analyze an image all at one time and convert the image information into visual output.

The RIP is a program that may be embedded in hardware or the may exist entirely in software. A hardware RIP is a computer which is attached to an output device and which is dedicated to translating digital image data for output. Image data is sent from a workstation to a computer that is attached to the output device. The hardware RIP program which resides in this computer interprets the image data and provides raw on/off instructions to the output device. The actual interpreter may be any program that translates image information in accordance with a known format. For example, the Postscript® interpreter manufactured by Adobe Corporation of Mountain View, Calif. is commonly used in raster image processing.

A software RIP performs many of the same functions as a hardware RIP. The software RIP is usually located at a workstation that is not necessarily dedicated solely to the RIP function. The software RIP interprets the digital image data and produces therefrom information that is required for the output device to function properly. A major disadvantage of software RIPs is that the workstation may not be configured to perform at speeds equal to a dedicated hardware RIP. Software RIPs are also presently less desirable for larger print facilities because such RIPs usually require a large amount of free hard disk space on the workstation. Such hard disk storage is necessary because all of the digital data that are processed must be saved before they are sent to the output device.

The RIPing process is complex and much of the output device rating is based upon the device's image processing speed. The speed of the interpreter or RIP is a major factor in the efficiency of the entire image reproduction process. Because of the dedicated computer, hardware RIPs are typically faster than software RIPs. Even so, it would be advantageous to provide improvements in RIP architectures that increase processing speed and efficiency.

SUMMARY OF THE INVENTION

The invention provides a multiple RIP system, which comprises a scalable architecture that enables faster system performance over multiple processors.

The system includes the following features:

Zero RIP: A language interpreter sub-RIP that interprets a print instruction file but does not process the graphics rendering steps or the post-language processing operators. The zero RIP provides several benefits over conventional RIP technology. For example, the zero RIP discovers page related attributes for individual pages within a multipage job and reports any potential errors or warnings with the file.

Thumb RIP: A very low resolution RIP that is used specifically for the creation of thumbnail images. The thumb RIP is much faster than a full resolution RIP process and requires less system resources than a full resolution RIP. The thumb RIP creates a small thumbnail image for viewing or for other purposes (e.g. toner estimation).

Push data flow instead of a pull model. Some benefits of this feature of the invention include a reduction in concurrent bus contention on a shared bus leading into the processors. This aspect of the invention also reduces overhead on a bus leading to the processors and saves time by reducing the number of processing steps.

Skip RIP: This feature of the invention interprets selected pages in a manner that skips all or most of the processing for that page. Pages to be skipped are scheduled for a different processor. This approach saves processing time and enables the provision of a multiple processor RIP. Skipping techniques include all or some of the following: RIP to low or zero resolution, skip the rendering step for said pages, skip the compression step for said pages, and change selected Postscript® commands for said pages.

Rules based scheduler on a page/face basis: This feature of the invention supports a dynamic assignment and assessment algorithm. Scheduling results in optimum use of available resources and requested print constraints (e.g. constrained time window) and optimum use of system bandwidth (e.g. bandwidth control).

Archiving and editing capability: This feature of the invention is an integrated system that enables tagged archiving of jobs or parts of jobs in a post RIPed (i.e. raster) format, for example in a special cache located within the multiRIP system.

Parallel RIPing using multiple processors: This feature of the invention uses multiple processors in the system, either on a single document or on more than one document.

DETAILED DESCRIPTION OF THE INVENTION

Figure 1:
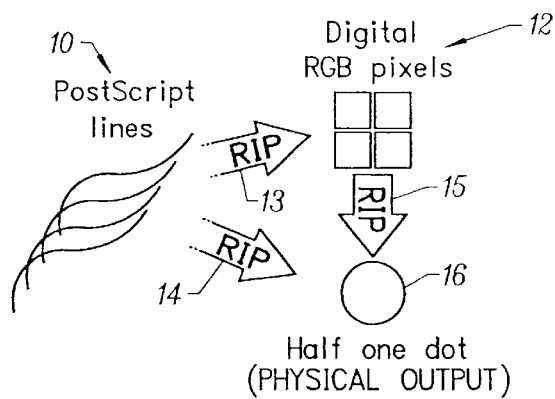
FIG. 1 is a block schematic diagram of a conventional raster image processing system.
Figure 2:
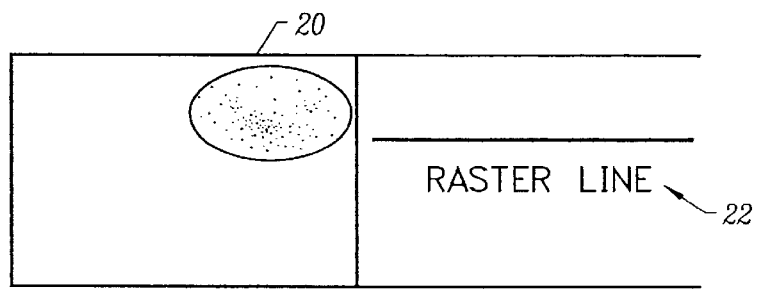
FIG. 2 is a drawing which illustrates the processing of a single raster image line.

The multiple RIP system disclosed herein is a scalable architecture which enables faster system performance over multiple processors.

The system includes the following features:

Zero RIP: A language interpreter sub-RIP that interprets the print instruction file but does not process the graphics rendering steps or the post-language processing operators. The zero RIP uses modifications to the setting of the standard PostScript interpreter and processes the PostScript stream in its entirety, but does not execute graphic commands beyond some minimum that is necessary to preserver the integrity of the PostScript processing. The zero RIP provides several benefits over conventional RIP technology. For example, the zero RIP discovers page related attributes for individual pages within a multipage job and reports any potential errors or warnings with the file.

Thumb RIP: A very low resolution RIP that is used specifically for the creation of thumbnail images. The thumb RIP is the processing stage where low resolution images are generated. Two methods implemented for the generation of thumbnails in the preferred embodiment of the invention. The first method uses sub-sampling techniques applied to the full resolution rendered page. In the second method, the rendered page can be generated in multiple formats, e.g. any bit depth per color plane and multiple compression techniques. The thumb RIP is much faster than a full resolution RIP process and requires less system resources than a full resolution RIP. The thumb RIP creates a small thumbnail image for viewing or for other purposes (e.g. toner estimation). It should be appreciated that a thumbnail could also be generated elsewhere in the system.

Using a push data flow model instead of a pull model. For purposes of the discussion herein, a push data flow model refers to an entire print job that is pushed to a RIP by a print server, while a pull data flow model refers to pages of a print job that are pulled from the print server by the RIP. Some benefits of this feature of the invention include a reduction in concurrent bus contention on a shared bus leading into the processors. This aspect of the invention also reduces overhead on a bus leading to the processors and saves time by reducing the number of processing steps.

Skip RIP: This feature of the invention interprets selected pages in a way to skip all or most of the processing for that page. In the presently preferred embodiment of the invention, the skip RIP is implemented using a job ticket technology. The job tickets enumerate for a specific RIP, i.e. the interpreter, which pages to render. The job ticket is processed according to the actual document's page description language. In the case of documents in the PDF format, the ability to skip pages is part of the language definition. In the case of other page description languages, e.g. PostScript and PCL, the standard interpreter setting is modified to allow page skipping, for example using the zero RIP discussed above. Pages to be skipped are scheduled for a different processor. This approach saves processing time and enables the provision of a multiple processor RIP.

Skipping techniques include all or some of the following:
RIP to low or zero resolution.
Skip the rendering step for these pages.
Skip the compression step for these pages.
Change selected Postscript® commands for these pages.

Rules based scheduler on a page/face basis: This feature of the invention supports a dynamic assignment and assessment algorithm. Scheduling may also be based on printer characteristics, e.g. color pages sent to a color printer and black and white pages sent to a monochrome printer. Scheduling is based on the job characteristics available from a current job ticket associated with the job. Job ticket information includes, for example, analysis of the page complexity, color spaces, and print engine requirements. The scheduler maintains the dynamic state of the available RIPs, e.g. the RIPs' characteristics, such as supported page sizes, finishing options, color or black and white, and the current load on each RIP, e.g. are the RIPs free and the number of pages in the RIPs' queues. The scheduler uses the page information and the RIP information to assign a page to a RIP. The assigned page includes RIPing instructions and the target printing device as part of the job ticket. Scheduling results in optimum use of available resources and requested print constraints (e.g. constrained time window) and optimum use of system bandwidth (e.g. bandwidth control).

Archiving and editing capability: This feature of the invention is an integrated system that enables tagged archiving of jobs or parts of jobs in a post RIPed (i.e. raster) format in a special cache located with in the multiRIP system. For purpose of the invention, tagging refers to the ability of the user or operator to tag or otherwise designate which jobs or parts of jobs should be automatically archived and in which format.

Parallel RIPing using multiple processors: This feature of the invention uses multiple processors, either on a single document or on more than one document.

System Data Flow

Figure 3:
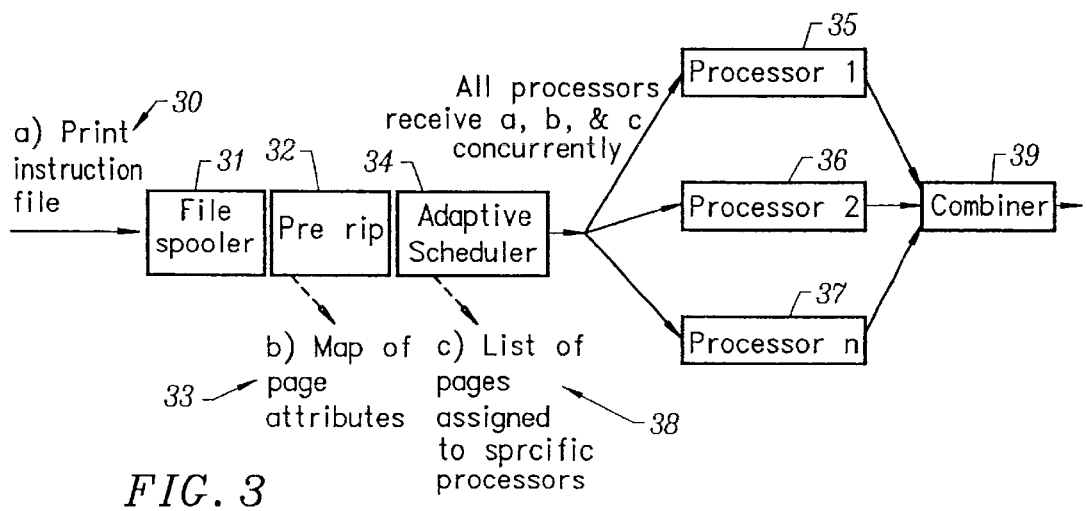
FIG. 3 is a block schematic diagram of a multiple RIP system according to the invention.

FIG. 3 is a block schematic diagram of a multiple RIP system according to the invention. A system controller receives all jobs to be printed. The print instruction file 30 can be a PostScript, PCL, or other page description language or data stream. Files are queued in the file spooler 31 for the pre-RIP 32. The pre-RIP performs a zero resolution RIP on the file, and generates a map 33 of page attributes, which attributes may include, for example, page size, complexity, and number of print separations (e.g. black and white, color, varnish, and high fidelity color). Next, a scheduler 34 assigns pages to specific processors 35–37, based on availability status provided by the processors, and also based on the map of page attributes from the pre-RIP. Then, the scheduler sends the original print instruction file to all of the processors, as well as a list 38 of which pages are assigned to which processor. As the processors complete the RIP step on their assigned pages, they make available the completed pages to the combiner 39, where the pages are combined into the final, ordered raster job.

System Components

Zero Rip

The zero RIP (or pre-RIP) is an extremely fast sub-RIP that can process a full PDL file in less than 1% of the time it would take for a normal RIP. The pre-RIP works this fast because it only engages the steps needed to get the resulting information that is needed. Operation of the zero RIP is discussed above.

Figure 4:
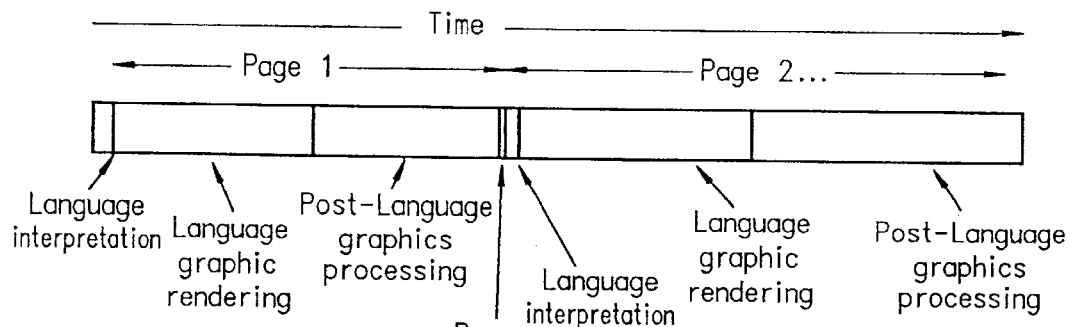
FIG. 4 is a flow diagram showing RIPing in a conventional raster image processing system.

FIG. 4 provides an example of two back-to-back pages being RIPed in a conventional RIP. Post-language processing includes such steps as enhancements, thumbnail generation, compression and storage.

Figure 5:
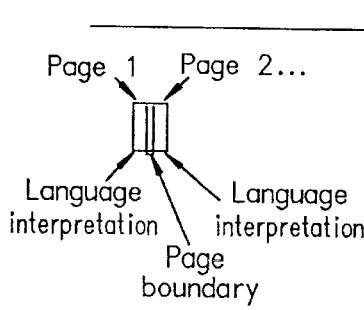
FIG. 5 is a flow diagram showing RIPing in a multiple RIP system according to the invention.

As shown in FIG. 5, the same two pages processed through the zero RIP. As discussed above, the zero RIP is a sub-RIP that interprets the print instruction file but does not process the graphics rendering steps or the post-language processing operators.

The output of the zero RIP is the following set of attributes per page:

Number of colors—e.g. monochrome, two color, four color, six color.

Finishing options.

Estimated time that page takes to RIP. The preferred embodiment of the invention predicts this time by counting painting operators and by using other attributes in this list to calculate a value.

Page size.

Simplex/Duplex.

Any errors or missing resources.

Adaptive Scheduler

The multiple RIP system automatically splits incoming jobs using the scheduler to optimize the system based on changing needs, minute by minute. For example, if there is a rush job to print, a user may select a rush request option on a job ticket and that job is automatically rushed through the system and split across the optimum number of RIPs for fastest available printing time. The system administrator can configure the system to allow only selected users the rush option. For purposes of the invention, it will be appreciated by those skilled in the art that the scheduler is comprised of any well known print driver that provides scheduling functions. Such print driver is modified in a manner readily apparent to those skilled in the art in view of the disclosure herein to add user options with regard to the multiple RIP features described herein.

Another example of the invention involves a large job that is in the print queue along with several small jobs. The scheduler technology saves at least one of the plural RIPs for small jobs to keep the print engines operating and gives the rest of the needed RIPs to the large job.

If multiple print engines are connected to the system, the scheduler routes the pages or jobs to the designated engine or the most cost effective engine for that particular job, based on user job ticket selections.

The system can receive jobs over network or media to one smart queue and automatically assign the job to the optimal RIP(s) and print engine(s), while sending the client up to the minute status.

The scheduler takes the following dynamic inputs:

Requested priority or fixed time window.

Cost-different engines have different costs.

Number of colors, e.g. monochrome, two color, four color, or six color.

Finishing options

Estimated time that the RIPs are busy, i.e. amount of work left per processor.

Optimal print engine loading, e.g. to keep a single engine cycled up for a highest percentage time and for multiple engines.

Long jobs—schedule to one engine, one RIP. For purposes of the discussion herein, a long job is a job that begins printing before it is fully spooled into the file spooler (e.g. the printing of a batch of telephone bills).

Batching of related page types to a RIP to optimize resources and to maximize performance.

The following are static inputs (i.e. inputs that change infrequently):

Administrative configuration:

EXAMPLE 1

Frees one RIP if pending small jobs (<100 pages or 40 MB) for optimal printer loading, especially if multiple engines are provided.

EXAMPLE 2

Optimizes for incoming job load by using an adaptive algorithm. For example, if the system normally reserves one RIP for smaller jobs and dedicates the other RIPs to larger jobs, it may be determined that the one RIP remains idle at such time as there are many larger jobs and no smaller jobs. The system adapts to this dynamic and releases the reserved RIP for use with larger jobs.

The output of the scheduler provides adaptive control, i.e. the ability to monitor actual system demands and operation and alter predetermined preferences in accordance therewith, over the following:

Which pages/faces are sent to which processor (RIP) and when and what order are they RIPed.

Which pages/faces are sent to which print engine and in what order.

Addition of a cover or slip sheet where applicable for a post processing step

Combiner

The combiner receives and re-orders the incoming pages and faces. The following pseudo code shows the combiner function in the preferred embodiment of the invention:

RIP

Page processing Done.

Send message with jobnumber, pagenumber, it's IP address to VPM

When asked by VPM, transfer the real page buffer.

When asked by VPM, free the page buffer memory.

Continue this with every page that it processes.

VPM (It maintains a list of job/page numbers already processed by all the RIPS)

```
Get message from RIP about the page
Is this the next expected job/page number.
If (Yes)          /* Yes */
    Send message to RIP asking it to send the real page buffer.
    Send message to RIP asking it to free the page buffer memory.
    Is the next page, required, in the list?
    If (Yes)
        repeat the process.
Else              /* No, not the expected page number */
    Save the message in the list.
```

Processor

Each processor (or set of processors sharing one system memory) has a RIP application running on it. Each RIP can process any one of multiple page description languages (PDLs), for example PDF, PS, and PCL. For purposes of implementing the invention described herein, those skilled in the art will appreciate that any standard hardware or software RIP may be used in connection with the various modules which comprise the invention. Further, the invention is intended for use in an environment that supports a hot pluggable interconnect. As such, additional RIPs may be added to the system while the system is in operation. The system recognizes such additional RIPs as they are added and assigns jobs to them (or receives requests for pages from them) without interruption in normal system operation.

Control

The presently preferred embodiment of the invention tags the information on each page using a job ticketing technique. For purposes of the invention herein, tagging refers to the known technique of placing all job attributes into a ticket or tag which, in the presently preferred embodiment of the invention, is generated by the multiRIP system. Such tags preferably include client preferences and job attributes.

PREFERRED EMBODIMENT

Figure 6:
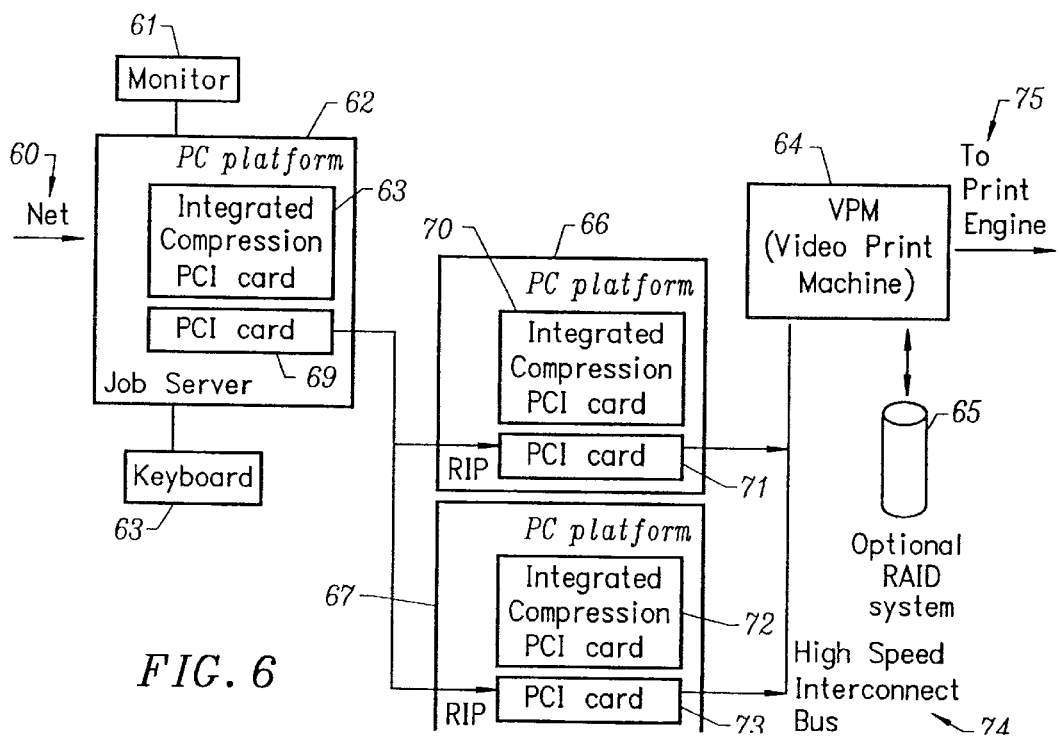
FIG. 6 is a block schematic diagram of a multiple RIP system according to a preferred embodiment of the invention.

FIG. 6 is a block schematic diagram of a multiple RIP system according to a preferred embodiment of the invention. In this embodiment of the invention, a job server 62 is connected to a network 60. The job server receives print jobs from various entities connected to the network. The job server in this embodiment of the invention includes a monitor 61 and a keyboard 63, although it is not necessary that these components be provided. For example, the job server could be an embedded server. The job server is implemented on a PC platform and includes a PCI card slot 69 that receives an integrated compression PCI card 68. This element of the system is not required by the invention. The actual operation and constitute elements of the job server are shown in FIG. 3.

The job server provides pages to each of multiple RIPs 66, 67. The multiple RIP processor system provides significant improvement in performance over that of a single RIP system. While two RIPs are shown in FIG. 6, the system can support any number of RIPs as may be desired. Each RIP in this embodiment of the invention includes a PCI card slot 71, 73 that receives an integrated compression PCI card 70, 72. This element of the system is not required by the invention.

The RIPs are connected to one or more video print machines 64 via a high speed interconnect bus 74. The video print machine provides output to a print engine 75 and includes a redundant array of inexpensive disks (RAID), which is an acceleration system 65 that is known in the art.

While FIG. 6 shows multiple RIPs connected to a single print engine, it should be appreciated the each RIP may be connected to a different, dedicated print engine or the RIPs may be dynamically assigned to any of a plurality of print engines as determined by the scheduler.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A raster image processing (RIP) system, comprising:
   a language interpreter sub-RIP that interprets an input print instruction file without processing graphics rendering steps or post-language processing operators;
   a rules based scheduler for assigning pages of said input print instruction file for raster image processing on either of a page or face basis or machine characteristic basis;
   a low resolution raster image processor (RIP) that creates a small thumbnail image of said input print instruction file or portions thereof for viewing;
   a skip raster image processor (RIP) having skipping techniques, that interprets selected pages in a way to skip all or most of the raster image processing for that page, wherein pages to be skipped are scheduled for a different processor, and wherein said skipping techniques include any of RIPing to low or zero resolution, skipping a rendering step for skipped pages, skipping a compression step for skipped pages; and changing selected interpreter commands for skipped pages;
   a plurality of raster image processors, wherein said raster image processing (RIP) system performs parallel RIPing using said plurality of raster image processors (RIPs), either on a single document or on more than one document; and wherein said plurality of raster image processors may optionally be added to said raster image processing (RIP) system dynamically; and archiving and editing means for tagged archiving of jobs or parts of jobs in a post RIPed format.

2. A raster image processing (RIP) system, comprising:
   a plurality of raster image processors (RIPs);
   a system controller for receiving all print instruction files containing information to be printed by said raster image processing (RIP) system;
   a file spooler in which said print instruction files are queued;
   an optional pre-RIP module for interpreting an input print instruction file without processing graphics rendering steps or post-language processing operators, and for generating a map of page attributes, which attributes include any of page size, complexity, and number of print separations;
   a scheduler for assigning pages to specific ones of said raster image processors (RIPs) based on availability status provided by said raster image processors (RIPs) and for receiving request for pages from specific ones of said raster image processors (RIPs), and also based on said map of page attributes provided by said optional pre-RIP module, if provided;
   a low resolution raster image processing (RIP) that creates a small thumbnail image of said input print instruction file or portions thereof for viewing;
   a skip raster image processing (RIP) having skipping techniques that interprets selected pages in a way to skip all or most of the raster image processing for that page, wherein pages to be skipped are scheduled for a different processor, and wherein said skipping techniques include any of RIPing to low or zero resolution, skipping a rendering step for skipped pages, skipping a compression step for skipped pages; and changing selected interpreter commands for skipped pages; and
   a combiner to which said raster image processors (RIPs) forward their assigned pages when said raster image processors (RIPs) have completed their raster image processing, said combiner combining said assigned pages into a final, ordered raster job.

3. The raster image processing (RIP) system of claim 2, wherein said optional pre-RIP module further comprises: a zero raster image processor (RIP) for interpreting said print instruction file but that does not process the graphics rendering steps or the post-language processing operators.

4. The raster image processing (RIP) system of claim 3, wherein output of said zero raster image processor (RIP) is any of following set of attributes per page: number of colors, finishing options, estimated time that page takes to raster image process (RIP), page size, simplex/duplex, and any errors or missing resources.

5. The raster image processing (RIP) system of claim 2, wherein said scheduler automatically splits incoming jobs to optimize dynamically the use of said plurality of raster image processors (RIPs).

6. The raster image processing (RIP) system of claim 2, wherein said scheduler saves at least one of said plurality of raster image processors RIPs for small jobs and gives the rest of said plurality of raster image processors (RIPs) as needed to a large job.

7. The raster image processing (RIP) system of claim 2, wherein said scheduler routes the pages or jobs to the most effective engine for that particular job based on user job ticket selections if multiple print engines are connected.

8. The raster image processing (RIP) system of claim 2, wherein said scheduler automatically assigns a job to an optimal raster image processor RIP and print engine.

9. The raster image processing (RIP) system of claim 2, wherein said scheduler takes any of the following dynamic inputs: requested priority or fixed time window; cost-different engines have different costs; color or black and white; number of colors; finishing options; estimated time that said plurality of raster image processors (RIPs) are busy; optimal print engine loading; scheduling jobs that begin printing before they are fully spooled into said file spooler; and batching of related page types to a raster image processor (RIP) to optimize resources and to maximize performance.

10. The raster image processing (RIP) system of claim 2, wherein one raster image processor (RIP) is freed if pending small jobs for optimal printer loading, especially if multiple print engines are available; and alternatively optimizes for incoming job load by using an adaptive algorithm.

11. The raster image processing (RIP) system of claim 2, wherein said scheduler provides adaptive control over any of the following: which page or face are sent to which raster image processor (RIP) and when and what order are they RIPed; which pages or faces are sent to which print engine and in what order; and addition of a cover or slip sheet where applicable for a post processing step.

12. The raster image processing (RIP) system of claim 2, wherein said combiner receives and reorders incoming pages and faces.

13. The raster image processing (RIP) system of claim 2, wherein each raster image processor (RIP) can process any one of multiple page description language (PDLs), including PDF, PostScript, and PCL.

14. The raster image processing (RIP) system of claim 2, wherein information on each page is tagged using a job ticketing technique.

* * * * *